United States Patent [19]

Peterson

[11] Patent Number: 5,525,459
[45] Date of Patent: Jun. 11, 1996

[54] PHOTOGRAPHIC FILM HAVING A MASK BAR CODE

[75] Inventor: Mark A. Peterson, River Falls, Wis.

[73] Assignee: Minnesota Mining and Manufacturing Company, St. Paul, Minn.

[21] Appl. No.: 404,333

[22] Filed: Mar. 15, 1995

[51] Int. Cl.$^6$ .............................. G03C 11/02; G06K 7/10
[52] U.S. Cl. ........................ 430/496; 430/501; 235/462; 364/237.85
[58] Field of Search .................................. 430/496, 501; 235/462; 364/237.85

[56] References Cited

U.S. PATENT DOCUMENTS

| | | | |
|---|---|---|---|
| 4,961,086 | 10/1990 | Takenaka | 235/462 |
| 5,122,645 | 6/1992 | Saeki et al. | 235/462 |
| 5,128,519 | 7/1992 | Tokuda | 235/462 |
| 5,212,367 | 5/1993 | Takenaka | 235/462 |
| 5,268,563 | 12/1993 | Takenaka | 235/462 |
| 5,336,873 | 8/1994 | Imamura | 235/462 |
| 5,343,265 | 8/1994 | Oi et al. | |
| 5,382,508 | 1/1995 | Ikenoue | 430/456 |
| 5,389,771 | 2/1995 | Amendolia | 235/454 |

OTHER PUBLICATIONS

Digital Optical Combined System DOCSY51, SanMarco Imaging.
Fiber Optic Line Annotation System, Photofinishing News Letter 12.09, Jan. 9, 1995.

*Primary Examiner*—Mark F. Huff
*Attorney, Agent, or Firm*—Gary L. Griswold; Walter N. Kirn; Mark A. Litman

[57] ABSTRACT

Photographic filmstrip susceptible of recording an ordered succession of image frames, which comprises in a non-image frame area thereof a photographically recorded, latent image mask bar code. The mask bar code is indicative of the intended use of the photographic film. Photofinishing machines, prior to printing the film, guide the film past an optical bar code reader in order to extract the information necessary to determine the required graphics around a print during the printing of the film, in accordance with the intended use of the film. The invention is particularly useful for use in lens-fitted photographic film packages which are customized for use in special events and/or special locations, and provides photographic prints with graphics.

5 Claims, No Drawings

PHOTOGRAPHIC FILM HAVING A MASK BAR CODE

FIELD OF THE INVENTION

The present invention relates to photographic filmstrips comprising photographically exposed mask bar codes and a method for providing photographic prints with graphics.

BACKGROUND OF THE INVENTION

Photographers usually carry a camera on trips, excursions or holidays, to take commemorative or souvenir pictures. However, because cameras are precision instruments and relatively massive and heavy, they are sometimes inconvenient to carry about. In addition to the inconvenience of carrying the camera, photographers often forget to take the camera with them. If photographers do not take cameras but decide to take pictures on a trip or the like, it is not feasible to buy a new, high-quality camera, as cameras are relatively expensive and are intended for a long use.

Lens-fitted photographic film packages are available on the market which provide the opportunity of taking pictures even when no camera is available. Usually, these film packages comprise a film case fitted with a taking lens, an exposure mechanism which includes a film-winding mechanism and a shutter mechanism with their associated elements incorporated in the film case, and a film cartridge previously packaged in the film case. These film packages, after the exposure of all frames of the film, are forwarded to photofinishers without removing the film. There, film packages are opened, the exposed films are developed to make prints therefrom, and the film packages without the films may be scrapped. The prints, together with the developed films, are returned to the photographers. Such film packages make it easy to take pictures because there is no need for film loading or unloading.

Usually, this type of lens-fitted photographic film package is provided with a 135-size film cartridge. By incorporating the 135-size filmstrip contained in a film cartridge (such as the 135-size photographic film cartridge defined by the standard ISO code 1007 1979 edition) in such film packages, the existing film processing systems can be used for lens-fitted film packages.

A problem with film packages containing a 135-size film in a cartridge is that the exposed film has to be removed from the film package in a darkroom because during exposure, the film is withdrawn from the cartridge one frame for each exposure and, after the exposure of all frames of the film, all of the film is completely withdrawn from the cartridge and is not rewound. Such darkroom film handling is quite troublesome when a large number of films is to be processed at once, as in automatic photofinisher labs. If the film package is adapted to rewind the fully exposed film, and the fully withdrawn film is rewound into the cartridge, the film can be removed from the film package in daylight. However, rewinding the exposed film into the cartridge requires both a film rewinding mechanism which increases the manufacturing cost and also film winding before removing the film from the film package. Therefore, a film package containing a 135-size photographic film, although providing for handling in daylight, decreases overall handling efficiency.

Recently, lens-fitted 135-size film packages (also known as photographic film-incorporated cameras or single-use cameras) have been introduced which make it possible to remove easily an exposed film in daylight. Said film packages incorporate a rolled 135-size filmstrip and an empty film cartridge (such as a conventional 135-size film cartridge) in a light-tight film case of the film package, the rolled film being wound up in the cartridge by one frame every exposure. Due to the provision of the empty cartridge in the light-tight film case of the film package, when the exposure of all frames of the film is completed, the film is entirely within the cartridge. Therefore, the cartridge can be taken out very easily, without any need for film rewinding. The exposed film is removed from the cartridge and handled in the same manner as conventional 135-size film for development and processing, while the film case is scrapped. For economy, the film case that incorporates the roll of film, the cartridge and the necessary elements is made of plastic materials and is configured as simply as possible. The lens-fitted photographic film package as sold is enclosed in a thin cardboard or plastic external case with an ornamental pattern printed thereon. Examples of lens-fitted 135-size photographic film packages are described, for example, in U.S. Pat. Nos. 4,758,852, 4,812,866, 4,833,495, 4,855,774, 4,884,087, 4,972,649, 4,827,298, 4,882,600, and 4,901,097 and in EP 527,430.

Additionally, U.S. Pat. No. 5,268,713 discloses a lens-fitted photographic film unit which is pre-loaded with unexposed photographic film. An exposure station is adapted to expose the film. A film-supplying chamber is disposed beside the exposure station for containing the unexposed film wound in a roll with a first film end wound internally in the roll. A film-take-up chamber is disposed on a side opposite to the film-supplying chamber with respect to the exposure station. A spool is rotatably contained in the take-up chamber, and the exposed film is wound up inside the film take-up chamber, after passage through a chamber entrance thereof, when the spool is rotated in a winding direction. An outer slot is formed in communication with the film take-up chamber for allowing the first film end to exit to an outside of the film unit when the film is rotated in an unwinding direction, which is reverse to the winding direction, after winding the entire film in the film take-up chamber. Accordingly, the exposed film is allowed to exit to the outside-the-film unit by an external operation after exposure, without the need of having a photographic cartridge.

The wide availability on the market of lens-fitted single-use film packages at low cost has resulted in the offer by manufacturers of lens-fitted single-use film packages which are differentiated by the intended uses. For example, it is possible to have in the marketplace lens-fitted single-use packages which are customized for special events (such as birthdays, weddings, anniversaries, contests, conventions, etc.) and/or special locations (cities, zoological gardens, recreation grounds, museums, etc.). Manufacturers can offer customized lens-fitted film packages simply by differentiating the cardboard or plastic case described above.

Photographers may enjoy receiving prints for their pictures in which the image is comprised in a border frame reminderful of the event and/or location. To that purpose, photofinishers can expose by contact in the photographic printing step the developed image frame with a suitable preformed mask and obtain a print with a border frame. Such an operation is quite troublesome when a large number of developed image frames are to be printed at once, represents the cost of an extra step, both in manually operated and in automated photofinishing machines, and reduces the overall printing efficiency.

Photographic films in strips can give information to the photofinisher to take advantage of certain automated cost-saving features which allow the photofinisher to process the film at a reduced cost. For manually operated photofinishing machines, the top edge of the strip film comprises eye-readable information to enable the operator to properly print the film. For example, the eye-readable information on the top edge of the film includes the manufacturer's name, the type of film, the speed of the film, and a number assigned by the film manufacturer designating the type of film. For automated photofinishing machines, a so-called "DX" bar code is provided along the bottom edge of the film between every half-frame number. The DX bar code, which is between each of these numbers, specifies the National Association of Photographic Manufacturers (NAPM) number which designates the type of film. Automatic photofinishing machines, prior to printing the film, guide the bottom edge of the filmstrip past an optical bar code reader to extract information necessary to determine the type of film. Additionally, a frame number bar code can be included along the top or bottom edge of the filmstrip at every frame which is used for reordering prints.

U.S. Pat. No. 5,343,265 describes some standardized package bodies for producing different film packages, such as standard type, telephoto type and panoramic type film packages. To print the photographic film in accordance with the photography type of the film package in which the photographic film has been loaded, the photographic films and/or film cassettes containing the photographic films are provided with indicia as to the photography type of the associated film packages. Mechanically detectable data, such as mechanically readable punch codes, or optically readable dot patterns are disclosed as indicia on the film to obtain prints of the required size.

It is an aspect of the present invention to provide a photographic filmstrip having information relating to the intended use of the said photographic film. It is a further object to provide a method of forming graphics in a photographic print produced from said photographic film.

SUMMARY OF THE INVENTION

The present invention describes a photographic filmstrip comprising a photographically recorded, latent image mask bar code. The mask bar code is indicative of the intended use of the photographic film. Photofinishing machines, prior to printing the film, guide the film past an optical bar code reader to extract the information necessary to determine the required border frame around a print during the printing of the film, in accordance with the intended use of the film. The invention is particularly useful for use in lens-fitted photographic film packages which are customized for use in special events and/or special locations, and provides photographic prints with graphics without the disadvantages discussed above. The photographically recorded, latent image bar code will exist within an area of the film which does not correspond to frames on the film in which images are to be exposed during use of the film. The frames where such images are to be exposed are initially free of any latent image which could be developed until such imagewise exposure.

DETAILED DESCRIPTION OF THE INVENTION

In one aspect, the present invention describes a photographic filmstrip comprising a photographically recorded, latent image mask bar code. The mask bar code is preferably recorded at one end of the photographic filmstrip, more preferably between the last image frame and the end of the photographic filmstrip. As employed herein, the term "mask bar code" refers either to a bar code which includes information relating to the intended use of the photographic film or eye-readable alphanumeric characters represented by the bar code.

As is well known in the art, various bar code systems are used to label items for product identification or other purposes. Generally, a bar code symbol consists of a sequence of light and dark regions referred to as elements or bars. These elements are typically rectangular in shape and often have a variety of widths. An arrangement of elements represents a character and is determined according to a set of rules and definitions typically referred to as a "code". Among the known bar code systems, for example, "Interleaved 2 of 5", "Industrial 2 of 5", and "Code 3 of 9" use a bi-level bar code system, and "UPC" (Universal Product Code) and the like use a multi-level bar code system. Any one of these bar code systems can be used in this invention. In an embodiment described herein, "Interleaved 2 of 5" is used for the mask bar code. "Interleaved 2 of 5" consists of wide and narrow bars and blanks (spaces) alternately arranged; the wider bar or space representing a binary number in 1's and the narrower band or space representing a binary number in 0's.

In one embodiment of the present invention, a mask bar code was exposed onto a 135-size 27-exposure multilayer silver halide color photographic film which was spooled in a conventional 135-size film cartridge. To expose the bar code onto the end of the film, the film was pulled out of the cartridge until the physical end of the film was reached, without detaching the film from the cartridge spool. The mask bar code was exposed onto the film between the end of the film protruding from the cartridge and the position of the film corresponding to image frame number 27. The mask bar code was used to represent the number 000000000000010 in "Interleaved 2 of 5" format. After exposing the mask bar code onto the film, the film was rewound back into the cartridge. Subsequently, the film was loaded into a conventional photographic single-use camera, which incorporates the rolled 135-size filmstrip and the empty film cartridge, the rolled film being wound up in the cartridge by one frame every exposure. During the camera-loading operation, the film was positioned such that frame number 27 was in the film plane of the camera. When the exposure of all frames of the film was completed, the film was entirely within the cartridge. Thereafter, the cartridge was taken out from the camera easily, without any need for film rewinding. The exposed film was removed from the cartridge and processed according to the conventional photographic film development processes. The processed film had the mask bar code at frame 27A and the image frames between the start of the film and frame 27. In this embodiment, two rectangular lines were exposed onto the film, parallel with the mask bar code. In photofinishing operations, these two lines helped to ensure that the mask bar code, scanned by automatic film-notching equipment, would be interpreted as being a photographic single-use camera exposure. Hence, the film notch at the mask bar code was used in automatic printing equipment to indicate where the mask bar code was positioned and subsequently should be scanned.

In this embodiment, the mask bar code was photographically recorded onto the photographic filmstrip after the film was spooled into the cartridge. As an alternative in the present invention, it is possible to photographically record the mask bar code onto the film during the spooling operation prior to insertion of the film into the cartridge.

In addition to the mask bar code in accordance with the invention, the photographic filmstrip can contain, along the opposing longitudinal edges thereof, latent images of photographically recorded information, such as eye-readable symbols representing each frame number, the manufacturer, the manufacturer's film code number, type of film, speed of film, generation of the film manufacturer, which enable the manual printing of film by a human operator, as well as bar code images, such as the DX binary bar code indicating the type of film, the speed of the film, and the like, for automated photofinishing equipment.

The bar coding system of the present invention is useful with any photographic film of film system which is known in the art or presently being developed. For example, the bar coding method of the present invention is useful in single use cameras (also known in the art as film exposure packages) and has obvious potential use in the recently announced Advanced Photo System (a new format for amateur film on a thinner polyethylene naphthalate base in a thinner cartridge).

A photofinishing equipment particularly suitable for use with the photographic film of the present invention uses a digital printing system which allows most kinds of electronic image manipulation and photoprint. In this equipment, the exposed mask bar code present on the processed photographic film is scanned and used to determine the type of mask that should appear on the print in accordance with the intended use of the film. The image frames present on the processed photographic film are also scanned to produce an electronic image. A useful scanner is, for example, Kodak RFS 2035, Polaroid Sprint Scan or Nikon LS3510AF scanners. A PC workstation, containing in a memory (e.g., RAM or other memories, such as, for example, a disk, tape, CD, and the like) predetermined masks corresponding to each mask bar code, acquires, combines and manipulates the electronic image of both the selected mask and the images frames. The predetermined mask corresponding to each mask bar code can be further manipulated by the operator acting on the PC workstation. For example, the mask may comprise a border frame to be located around the perimeter of the image frame, graphic additions in the image frame area, or combinations thereof. As employed in the present invention, the term "graphics" refers to such predetermined border frame and/or manipulated computer generated additions to the image frame. The electronic image signals, which now consist of the image exposed by the photographer in the camera and the corresponding mask, are then transferred into printing equipment.

In the present invention, every electronic printing system (either optical or thermal) with capability of providing continuous-tone full-color images from electronic image signals can be used. As an example of electronic optical printing system, the electronic image signals can be reconverted into light signals with a cathode ray tube and brought together to form a negative; by conventional means, this newly created negative is projected through a lens with very high light-transmitting capacity onto a photographic paper, which is conventionally processed to obtain photographic prints with border frames. Alternatively, the electronic image signals can be used to modulate, through an optical laser scanner, the image onto a photographic paper, which is processed as above. Optical electronic printers are available on the market, such as, for example, the SanMarco DOCSY 51 Printer and the Agfa DPS Cathode Ray Tube Printer, which provide prints from various digital image inputs such as Photo CD, floppy disk, video camera, scanned print/negative/transparency, and the like. These printers can also provide a combined optical-electronic printing, in which two different images input (i.e., a digital input represented by the mask corresponding to the scanned mask bar code, and a photographic input represented by the photographic image frame onto the photographic filmstrip) are printed in combination through a first digital exposure and then an optical exposure onto the photographic paper. As media for photographic prints which can be used for obtaining full-color images with graphics in accordance with the present invention, other conventional media can be used instead of the conventional, wet processed photographic paper, namely media for obtaining color images by dry processes. As an example of thermal electronic printing system, the electronic image signals can be printed through a thermal printer provided with thermal heads or laser using the dye diffusion thermal transfer system in which a thermal dye transfer donating material ("dye-donor") is brought into contact with a thermal dye transfer receiving material ("dye-receptor") and selectively, in response to the electronic signal defining the mask and the image, is heated with the thermal printing head or laser. Dye from the selectively heated regions of the dye donor is transferred to the dye receptor and forms the image thereon. Thermal electronic printers are available on the market, such as, for example, the Kyocera KTM 128 Thermal Printer.

Accordingly, in another aspect the present invention relates to a method for obtaining photographic prints with graphics, wherein a photographic filmstrip comprising a photographically recorded, latent image mask bar code is imagewise exposed and processed to obtain a mask bar code and an ordered sequence of image frames, the mask bar code and the image frames are scanned by means of a scanner, the detected analog signals are processed and binarised by analog/digital converting means to obtain a sequence of digital images corresponding to the sequence of image frames, the obtained digital information is transferred to a host computer to select a mask corresponding to the bar code and combine the mask with each digital image, and the selected mask and the digital images are transmitted to an electronic printer to obtain an image print of each digital image with graphics corresponding to the selected mask.

The photographic film comprising the mask bar code according to the present invention is useful as a photographic film loaded into photographic cartridges offered in the marketplace for particular events and/or locations. Example of photographic cartridges include 110-size film cartridges, 135-size film cartridges and film cartridges described, for example, in U.S. Pat. Nos. 5,296,886, 5,296,887, 5,317,355 and 5,347,334.

The photographic film comprising the mask bar code according to the present invention is particularly useful in so-called lens-fitted photographic film packages. Accordingly, in a further aspect the present invention relates to a lens-fitted photographic film package having an unexposed photographic filmstrip susceptible of recording an ordered succession of image frames loaded therein, said package comprising a light-tight film casing having an exposure station at which said film is photographically exposed, a film supply chamber disposed beside said exposure station which contains initially said filmstrip, before exposure, wound in the form of a roll, a film end being wound internally in said roll, a film take-up chamber disposed on a side of said exposure station which is opposite to said film supplying chamber, and externally operable film-winding member for winding the rolled film into the film take-up chamber, wherein the photographic filmstrip comprises in a non-image frame area thereof a photographically recorded, latent image mask bar code.

A lens-fitted photographic film package particularly useful in the present invention comprises a light-tight film case made of plastic, having an exposure opening, a rolled photographic filmstrip disposed on one side of the exposure opening in the light-tight casing, a removable light-tight cartridge having a film-winding spool therein disposed on the other side of the exposure opening in the light-tight film case, and an externally operable film-winding member for winding the rolled film around said film-winding spool of the light-tight cartridge. The lens-fitted photographic film package can be assembled by the steps of withdrawing the film from the cartridge, photographically recording the mask bar code onto the film, winding the film in a roll, loading the rolled film and the light-tight film cartridge in separate respective receiving chambers formed in the lens-fitted photographic film package. It is also possible to expose the film to form the latent mask bar code before insertion of the filmstrip into the cartridge. This would combine the winding and rewinding steps.

Another example of a lens-fitted photographic film package, which can be pre-loaded with an unexposed photographic film having the mask bar code, comprises an exposure station adapted to expose the film, a film-supplying chamber disposed beside the exposure station for containing the unexposed film wound in a roll with a first film end wound internally in the roll, and a film-take-up chamber disposed on a side opposite to the film-supplying chamber with respect to the exposure station. A spool is rotatably contained in the take-up chamber, and the exposed film is wound up inside the film take-up chamber, after passage through a chamber entrance thereof, when the spool is rotated in a winding direction. An outer slot is formed in communication with the film take-up chamber for allowing the first film end to exit the film unit when the film is rotated in an unwinding direction, which is reverse to the winding direction, after winding the entire film in the film take-up chamber. Accordingly, the exposed film is allowed to exit to the outside of the film unit by an external operation after exposure, without the need of having a photographic cartridge.

The photographic film for use in the present invention can be any photographic element containing a silver halide as a light-sensitive substance.

The silver halides used in the photographic element may be a fine dispersion (emulsion) of silver chloride, silver bromide, silver chloro-bromide, silver iodo-bromide and silver chloro-iodo-bromide grains in a hydrophilic binder. Preferred silver halides are silver iodo-bromide or silver iodo-bromo-chloride containing 1 to 20% mole silver iodide. In silver iodo-bromide emulsions or silver iodo-bromo-chloride, the iodide can be uniformly distributed among the emulsion grains, or iodide level can be varied among the grains. The silver halides can have a uniform grain size or a broad grain size distribution. The silver halide grains may be regular grains having a regular crystal structure such as cubic, octahedral, and tetradecahedral, or the spherical or irregular crystal structure, or those having crystal defects such as twin plane, or those having a tabular form, or a combination thereof. Particularly good results are obtained with silver halide grains having average grain sizes in the range from 0.2 to 3 µm, more preferably from 0.4 to 1.5 µm. Preparation of silver halide emulsions comprising cubic silver iodobromide grains is described, for example, in Research Disclosure, Vol. 184, Item 18431, Vol. 176, Item 17644 and Vol. 308, Item 308119.

It is known that photosensitive silver halide emulsions can be formed by precipitating silver halide grains in an aqueous dispersing medium comprising a binder, gelatin preferably being used as a binder.

The silver halide grains may be precipitated by a variety of conventional techniques. The silver halide emulsion can be prepared using a single-jet method, a double-jet method, or a combination of these methods or can be matured using, for instance, an ammonia method, a neutralization method, an acid method, or an accelerated or constant flow rate precipitation, interrupted precipitation, ultrafiltration during precipitation, etc., can be performed. References can be found in Trivelli and Smith, The Photographic Journal, Vol. LXXIX, May 1939, pp. 330–338, T. H. James, The Theory of The Photographic Process, 4th Edition, Chapter 3, U.S. Pat. Nos. 2,222,264, 3,650.757, 3,917,485, 3,790,387, 3,716,276, 3,979,213, Research Disclosure, Dec. 1989, Item 308119 "Photographic Silver Halide Emulsions, Preparations, Addenda, Processing and Systems", and Research Disclosure, Sept. 1976, Item 14987.

One common technique is a batch process commonly referred to as the double-jet precipitation process by which a silver salt solution in water and a halide salt solution in water are concurrently added into a reaction vessel containing the dispersing medium.

In the double jet method, in which alkaline halide solution and silver nitrate solution are concurrently added in the gelatin solution, the shape and size of the formed silver halide grains can be controlled by the kind and concentration of the solvent existing in the gelatin solution and by the addition speed. Double-jet precipitation processes are described, for example, in GB 1,027,146, GB 1,302,405, U.S. Pat. No. 3,801,326, U.S. Pat. No. 4,046,376, U.S. Pat. No. 3,790,386, U.S. Pat. No. 3,897,935, U.S. Pat. No. 4,147,551, and U.S. Pat. No. 4,171,224.

The single jet method in which a silver nitrate solution is added in a halide and gelatin solution has long been used for manufacturing photographic emulsion. In this method, because the varying concentration of halides in the solution determines which silver halide grains are formed, the formed silver halide grains are a mixture of different kinds of shapes and sizes.

Precipitation of silver halide grains usually occurs in two distinct stages. In a first stage, nucleation, formation of fine silver halide grain, occurs. This is followed by a second stage, the growth stage, in which additional silver halide formed as a reaction product precipitates onto the initially formed silver halide grains, resulting in a growth of these silver halide grains. Batch double-jet precipitation processes are typically undertaken under conditions of rapid stirring of reactants in which the volume within the reaction vessel continuously increases during silver halide precipitation and soluble salts are formed in addition to the silver halide grains.

To avoid soluble salts in the emulsion layers of a photographic material from crystallizing out after coating and other photographic or mechanical disadvantages (stickiness, brittleness, etc.), the soluble salts formed during precipitation have to be removed.

In preparing the silver halide emulsions, a wide variety of hydrophilic dispersing agents for the silver halides can be employed. As hydrophilic dispersing agent, any hydrophilic polymer conventionally used in photography can be advantageously employed including gelatin; a gelatin derivative such as acylated gelatin, graff gelatin, etc.; albumin; gum arabic; agar agar; a cellulose derivative, such as hydroxyethylcellulose, carboxymethylcellulose, etc.; or a synthetic resin, such as polyvinyl alcohol, polyvinylpyrrolidone, polyacrylamide, etc. Other hydrophilic materials useful known in the art are described, for example, in Research Disclosure, Vol. 308, Item 308119, Section IX.

The silver halide grain emulsion can be chemically sensitized using sensitizing agents known in the art. Sulfur-containing compounds, gold and noble metal compounds, and polyoxylakylene compounds are particularly suitable. In particular, the silver halide emulsions may be chemically sensitized with a sulfur sensitizer, such as sodium thiosulfate, allylthiocyanate, allylthiourea, thiosulfinic acid and its sodium salt, sulfonic acid and its sodium salt, allylthiocarbamide, thiourea, cystine, etc.; an active or inert selenium sensitizer; a reducing sensitizer such as stannous salt, a polyamine, etc.; a noble metal sensitizer, such as gold sensitizer, more specifically potassium aurithiocyanate, potassium chloroaurate, etc.; or a sensitizer of a water-soluble salt of, for instance, ruthenium, rhodium, iridium and the like, more specifically, ammonium chloropalladate, potassium chloroplatinate and sodium chloropalladite, etc.; each being employed either alone or in a suitable combination. Other useful examples of chemical sensitizers are described, for example, in Research Disclosure 17643, Section III, 1978 and in Research Disclosure 308119, Section III, 1989.

The silver halide emulsion can be spectrally sensitized with dyes from a variety of classes, including the polymethyne dye class, which includes the cyanines, merocyanines, complex cyanines and merocyanines, oxonols, hemioxonols, styryls, merostyryls, and streptocyanine.

The cyanine spectral sensitizing dyes include, joined by a methine linkage, two basic heterocyclic nuclei, such as those derived from quinoline, pyrimidine, isoquinoline, indole, benzindole, oxazole, thiazole, selenazole, imidazole, benzoxazole, benzothiazole, benzoselenazole, benzoimidazole, naphthoxazole, naphthothiazole, naphthoselenazole, tellurazole, oxatellurazole.

The merocyanine spectral sensitizing dyes include, joined by a methine linkage, a basic heterocyclic nucleus of the cyanine-dye type and an acidic nucleus, which can be derived from barbituric acid, 2-thiobarbituric acid, rhodanine, hydantoin, 2-thiohydantoin, 2-pirazolin-5-one, 2-isoxazolin-5-one, indan-1,3-dione, cyclohexane-1,3-dione, 1,3-dioxane-4,6-dione, pyrazolin-3,5-dione, pentane-2,4-dione, alkylsulfonylacetonitrile, malononitrile, isoquinolin-4-one, chromane-2,4-dione, and the like.

One or more spectral sensitizing dyes may be used. Dyes with sensitizing maxima at wavelengths throughout the visible and infrared spectrum and with a great variety of spectral sensitivity curve shapes are known. The choice and relative proportion of dyes depends on the region of the spectrum to which sensitivity is desired and on the shape of the spectral sensitivity desired.

Examples of sensitizing dyes can be found in Venkataraman, *The chemistry of Synthetic Dyes*, Academic Press, New York, 1971, Chapter V, James, *The Theory of the Photographic Process*, 4th Ed., Macmillan, 1977, Chapter 8, F. M. Hamer, *Cyanine Dyes and Related Compounds*, John Wiley and Sons, 1964, and in Research Disclosure 308119, Section III, 1989.

The silver halide emulsions can contain optical brighteners, antifogging agents and stabilizers, filtering and antihalo dyes, hardeners, coating aids, plasticizers and lubricants and other auxiliary substances, as for instance described in Research Disclosure 17643, Sections V, VI, VIII, X, XI and XII, 1978, and in Research Disclosure 308119, Sections V, VI, VIII, X, XI, and XII, 1989.

The silver halide emulsion can be used for the manufacture of multilayer light-sensitive silver halide color photographic elements, such as color negative photographic elements, color reversal photographic elements, color positive photographic elements and the like, the preferred ones being color negative photographic elements.

Silver halide multilayer color photographic elements usually comprise, coated on a support, a red-sensitized silver halide emulsion layer associated with cyan dye-forming color couplers, a green-sensitized silver halide emulsion layer associated with magenta dye-forming color couplers and a blue-sensitized silver halide emulsion layer associated with yellow dye-forming color couplers. Each layer can comprise a single emulsion layer or multiple emulsion sub-layers sensitive to a given region of visible spectrum. When multilayer materials contain multiple blue, green or red sub-layers, there can be in any case relatively faster and relatively slower sub-layers. These elements additionally comprise other non-light sensitive layers, such as intermediate layers, filter layers, antihalation layers and protective layers, thus forming a multilayer structure. These color photographic elements, after imagewise exposure to actinic radiation, are processed in a chromogenic developer to yield a visible color image. The layer units can be coated in any conventional order, but in a preferred layer arrangement the red-sensitive layers are coated nearest the support and are overcoated by the green-sensitive layers, a yellow filter layer and the blue-sensitive layers.

Suitable color couplers are preferably selected from the couplers having diffusion-preventing groups, such as groups having a hydrophobic organic residue of about 8 to 32 carbon atoms, introduced into the coupler molecule in a non-splitting-off position. Such a residue is called a "ballast group". The ballast group is bonded to the coupler nucleus directly or through an imino, ether, carbonamido, sulfonamido, ureido, ester, imido, carbamoyl, sulfamoyl bond, etc. Examples of suitable ballasting groups are described in U.S. Pat. No. 3,892,572.

Said non-diffusible couplers are introduced into the light-sensitive silver halide emulsion layers or into non-light-sensitive layers adjacent thereto. On exposure and color development, said couplers give a color which is complementary to the light color to which the silver halide emulsion layers are sensitive. Consequently, at least one non-diffusible cyan-image-forming color coupler, generally a phenol or an α-naphthol compound, is associated with red-sensitive silver halide emulsion layers, at least one non-diffusible magenta image-forming color coupler, generally a 5-pyrazolone or a pyrazolotriazole compound, is associated with green-sensitive silver halide emulsion layers and at least one non-diffusible yellow image-forming color coupler, generally an acylacetanilide compound, is associated with blue-sensitive silver halide emulsion layers.

Said color couplers may be 4-equivalent and/or 2-equivalent couplers, the latter requiring a smaller amount of silver halide for color production. As is well known, 2-equivalent couplers derive from 4-equivalent couplers since, in the coupling position, they contain a substituent which is released during coupling reaction. 2-Equivalent couplers which may be used in silver halide color photographic elements include both those substantially colorless and those which are colored ("masking couplers"). The 2-equivalent couplers also include white couplers which do not form any dye on reaction with the color developer oxidation products. The 2-equivalent color couplers include also DIR couplers which are capable of releasing a diffusing development-inhibiting compound on reaction with the color developer oxidation products.

The most useful cyan-forming couplers are conventional phenol compounds and α-naphthol compounds. Examples of cyan couplers can be selected from those described in U.S. Pat. Nos. 2,369,929; 2,474,293; 3,591,383; 2,895,826; 3,458,315; 3,311,476; 3,419,390; 3,476,563 and 3,253,924; in British patent 1,201,110, and in Research Disclosure 308119, Section VII, 1989.

The most useful magenta-forming couplers are conventional pyrazolone-type compounds, indazolone-type compounds, cyanoacetyl compounds, pyrazo-lotriazole-type compounds, etc., and particularly preferred couplers are pyrazolone-type compounds. Magenta-forming couplers are described, for example, in U.S. Pat. Nos. 2,600,788, 2,983, 608, 3,062,653, 3,127,269, 3,311,476, 3,419,391, 3,519,429, 3,558,319, 3,582,322, 3,615,506, 3,834,908 and 3,891,445, in DE patent 1,81 0,464, in DE patent applications 2,408, 665, 2,417,945, 2,418,959 and 2,424,467; in JP patent applications 20,826/76, 58,922/77, 129,538/74, 74,027/74, 159,336/75, 42,121/77, 74,028/74, 60,233/75, 26,541/76 and 55,122/78, and in Research Disclosure 308119, Section VII, 1989.

The most useful yellow-forming couplers are conventional open-chain ketomethylene-type couplers. Particular examples of such couplers are benzoyl-acetanilide-type and pivaloyl acetanilide-type compounds. Yellow-forming couplers that can be used are specifically described in U.S. Pat. Nos. 2,875,057, 3,235,924, 3,265,506, 3,278,658, 3,369, 859, 3,408,194, 3,415,652 3,528,322, 3,551,151, 3,682,322, 3,725,072 and 3,891,445, in DE patents 2,219,917, 2,261, 361 and 2,414,006, in GB patent 1,425,020, in JP patent 10,783/76 and in JP patent applications 26,133/72, 73,147/ 73, 102,636/76, 6,341175, 123,342/75, 130,442/75, 1,827/ 76, 87,650/75, 82,424177 and 115,219/77, and in Research Disclosure 308119, Section VII, 1989.

Colored couplers can be used which include those described, for example, in U.S. Pat. Nos. 3,476,560, 2,521, 908 and 3,034,892, in JP patent publications 2,016/69, 22,335/63, 11,304/67 and 32,461/69, in JP patent applications 26,034/76 and 42,121/77 and in DE patent application 2,418,959. The light-sensitive silver halide color photographic element may contain high molecular weight color couplers as described, for example, in U.S. Pat. No. 4,080, 211, in EP Pat. Appl. No. 27,284 and in DE Pat. Appl. Nos. 1,297,417, 2,407,569, 3,148,125, 3,217,200, 3,320,079, 3,324,932, 3,331,743, and 3,340,376, and in Research Disclosure 308119, Section VII, 1989.

Colored cyan couplers can be selected from those described in U.S. Pat. Nos. 3,934,802; 3,386,301 and 2,434, 272, colored magenta couplers can be selected from the colored magenta couplers described in U.S. Pat. Nos. 2,434, 272; 3,476,564 and 3,476,560 and in British patent 1,464, 361. Colorless couplers can be selected from those described in British patents 861,138; 914,145 and 1,109,963 and in U.S. Pat. No. 3,580,722 and in Research Disclosure 308119, Section VII, 1989.

Also, couplers providing diffusible colored dyes can be used together with the above-mentioned couplers for improving graininess, and specific examples of these couplers are magenta couplers described in U.S. Pat. No. 4,366,237 and GB Pat. No. 2,125,570 and yellow, magenta and cyan couplers described in EP Pat. No. 96,873, in DE Pat. Appl. No. 3,324,533 and in Research Disclosure 308119, Section VII, 1989.

Also, among the 2-equivalent couplers are those couplers which carry in the coupling position a group which is released in the color-development reaction to give a certain photographic activity, e.g., as development inhibitor or accelerator or bleaching accelerator, either directly or after removal of one or further groups from the group originally released. Examples of such 2-equivalent couplers include the known DIR couplers as well as DAR, FAR and BAR couplers. Typical examples of said couplers are described in DE Pat. Appl. Nos. 2,703,145, 2,855,697, 3,105,026, 3,319, 428, 1,800,420, 2,015,867, 2,414,006, 2,842,063, 3,427,235, 3,209,110, and 1,547,640, in GB Pat. Nos. 953,454 and 1,591,641, in EP Pat. Appl. Nos. 89,843, 117,511, 118,087, 193,389, and 301,477 and in Research Disclosure 308119, Section VII, 1989.

Examples of noncolor-forming DIR coupling compounds which can be used in silver halide color elements include those described in U.S. Pat. Nos. 3,938,996; 3,632,345; 3,639,417; 3,297,445 and 3,928,041;in German patent applications S.N. 2,405,442; 2,523,705; 2,460,202; 2,529,350 and 2,448,063; in Japanese patent applications S.N. 143, 538/75 and 147,716/75, in British patents 1,423,588 and 1,542,705 and 301,477 and in Research Disclosure 308119, Section VII, 1989.

In order to introduce the couplers into the silver halide emulsion layer, some conventional methods known to those skilled in the art can be employed. According to U.S. Pat. Nos. 2,322,027, 2,801,170, 2,801,171 and 2,991,177, the couplers can be incorporated into the silver halide emulsion layer by the dispersion technique, which consists of dissolving the coupler in a water-immiscible high-boiling organic solvent and then dispersing such a solution in a hydrophilic colloidal binder under the form of very small droplets. The preferred colloidal binder is gelatin, even if some other kinds of binders can be used.

Another type of introduction of the couplers into the silver halide emulsion layer consists of the so-called "loaded-latex technique". A detailed description of such technique can be found in BE patents 853,512 and 869,816, in U.S. Pat. Nos. 4,214,047 and 4,199,363 and in EP patent 14,921. It consists of mixing a solution of the couplers in a water-miscible organic solvent with a polymeric latex consisting of water as a continuous phase and of polymeric particles having a mean diameter ranging from 0.02 to 0.2 micrometers as a dispersed phase.

Another useful method is further the Fisher process. According to such a process, couplers having a water-soluble group, such as a carboxyl group, a hydroxy group, a sulfonic group or a sulfonamido group, can be added to the photographic layer, for example, by dissolving them in an alkaline water solution.

Useful methods of introduction of couplers into silver halide emulsions are described in Research Disclosure 308119, Section VII, 1989.

The layers of the photographic elements can be coated on a variety of supports, such as cellulose ester supports (e.g., cellulose triacetate supports), paper supports, polyester film supports (e.g., polyethylene terephthalate film supports or polyethylene naphthalate film supports), and the like, as described in Research Disclosure 308119, Section XVII, 1989.

The photographic elements may be processed after exposure to form a visible image upon association of the silver halides with an alkaline aqueous medium in the presence of a developing agent contained in the medium or in the material, as known in the art. The aromatic primary amine color-developing agent used in the photographic color-developing composition can be any of known compounds of the class of p-phenylendiamine derivatives, widely employed in various color photographic process. Particularly useful color-developing agents are the p-phenylendiamine derivatives, especially the N,N-dialkyl-p-phenylene diamine derivatives wherein the alkyl groups or the aromatic nucleus can be substituted or not substituted.

Examples of p-phenylene diamine developers include the salts of: N,N-diethyl-p-phenylendiamine, 2-amino-5-diethylamino-toluene, 4-amino-N-ethyl-N-(α-methanesulphonamidoethyl)-m-toluidine, 4-amino-3-methyl-N-ethyl-N-(α-hydroxy-ethyl)-aniline, 4-amino-3-(α-methylsulfonamido-ethyl)-N,N-diethylaniline, 4-amino-N,N-diethyl-3-(N'-methyl-α-methylsulfonamido)-aniline, N-ethyl-N-methoxyethyl- 3-methyl-p-phenylenediamine and the like, as described, for instance, in U.S. Pat. Nos. 2,552,241; 2,556,271; 3,656,950 and 3,658,525.

Examples of commonly used developing agents of the p-phenylene diamine salt type are: 2-amino-5-diethylaminotoluene hydrochloride (generally known as CD2 and used in the developing solutions for color positive photographic material), 4-amino-N-ethyl-N-(α-methanesulfonamidoethyl)-m-toluidine sesquisulfate monohydrate (generally known as CD3 and used in the developing solution for photographic papers and color-reversal materials) and 4-amino- 3-methyl-N-ethyl-N-(β-hydroxy-ethyl)-aniline sulfate (generally known as CD4 and used in the developing solutions for color negative photographic materials).

Said color-developing agents are generally used in a quantity from about 0.001 to about 0.1 moles per liter, preferably from about 0.0045 to about to about 0.04 moles per liter of photographic color-developing compositions.

In the case of color photographic materials, the processing comprises at least a color-developing bath and, optionally, a prehardening bath, a neutralizing bath, a first (black and white) developing bath, etc. These baths are well known in the art and are described, for instance, in Research Disclosure 17643, 1978, and in Research Disclosure 308119, Sections XIX and XX, 1989.

After color development, the image-wise developed metallic silver and the remaining silver salts generally must be removed from the photographic element. This is performed in separate bleaching and fixing baths or in a single bath, called blix, which bleaches and fixes the image in a single step. The bleaching bath is a water solution having a pH equal to 5.60 and containing an oxidizing agent, normally a complex salt on an alkali metal or of ammonium and of trivalent iron with an organic acid, e.g., EDTA.Fe.NH4, wherein EDTA is the ethylenediaminotetraacetic acid, or PDTA.Fe.NH4, wherein PDTA is the propylenediaminotetraacetic acid. While processing, this bath is continuously aired to oxidize the divalent iron which forms while bleaching the silver image and regenerated, as known in the art, to maintain the bleach effectiveness. The bad working of these operations may cause the drawback of the loss of cyan density 5 of the dyes.

Further to the above-mentioned oxidizing agents, the blix bath can contain known fixing agents, such as, for example, ammonium or alkali metal thiosulfates, Both bleaching and fixing baths can contain other additives, e.g., polyalkyleneoxide compounds, as described, for example, in GB patent 933,008 in order to increase the effectiveness of the bath, or thioether compounds known as bleach accelerators.

While the invention has been described in detail by specific reference to preferred embodiments thereof, it is understood that variations and modifications may be made without departing from the spirit and scope of the invention.

I claim:

1. A photographic filmstrip susceptible of recording an ordered succession of image frames, film strip which comprises in a non-image frame area thereof a photographically recorded, latent image mask bar code.

2. The photographic filmstrip of claim 1, wherein the mask bar code is comprised between an end of the film strip adjacent to an area where the last image frame may be exposed and the last image frame of the film.

3. The photographic filmstrip of claim 1, wherein the photographic film is a silver halide color photographic element having, coated on a support, one or more cyan coupler-containing red-sensitive silver halide emulsion layers, one or more magenta coupler-containing green-sensitive silver halide emulsion layers, and one or more yellow coupler-containing blue-sensitive silver halide emulsion layers.

4. The film strip of claim 1 wherein all areas of said film strip which do not contain said latent image mask bar code also do not contain any latent images therein.

5. A photographic film strip on which has been recorded in the form of latent images an ordered succession of image frames, which film strip comprises in a non image frame area thereof a photographically recorded, latent image mask bar code.

\* \* \* \* \*